(12) United States Patent
Patavardhan et al.

(10) Patent No.: US 10,579,943 B2
(45) Date of Patent: Mar. 3, 2020

(54) ENGINEERING DATA ANALYTICS PLATFORMS USING MACHINE LEARNING

(71) Applicant: Accenture Global Solutions Limited, Dublin (IE)

(72) Inventors: Sudhir Ranganna Patavardhan, Karnataka (IN); Arun Ravindran, Somerville, MA (US); Anu Tayal, Chandigarh (IN); Naga Viswanath, London (GB); Lisa X. Wilson, Chicago, IL (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/120,140

(22) Filed: Aug. 31, 2018

(65) Prior Publication Data
US 2019/0130313 A1 May 2, 2019

(30) Foreign Application Priority Data
Oct. 30, 2017 (IN) .............................. 201711038396

(51) Int. Cl.
*G06N 20/00* (2019.01)
*G06N 5/04* (2006.01)

(52) U.S. Cl.
CPC ............... *G06N 20/00* (2019.01); *G06N 5/04* (2013.01)

(58) Field of Classification Search
CPC ........... G06F 8/60; G06N 99/005; G06N 5/04
See application file for complete search history.

(56) References Cited

U.S. PATENT DOCUMENTS 8,996,781 B2  3/2015  Schuette et al.
9,626,710 B1  4/2017  Chheda et al.
(Continued)

OTHER PUBLICATIONS

Sadeka Islam, Jacky Keung, Kevin Lee, and Anna Liu, "Empirical prediction models for adaptive resource provisioning in the cloud", Jun. 25, 2011, Future Generation Computer Systems 28, pp. 155-162. (Year: 2011).*

(Continued)

*Primary Examiner* — Kamran Afshar
*Assistant Examiner* — Ying Yu Chen
(74) *Attorney, Agent, or Firm* — Fish & Richardson P.C.

(57) ABSTRACT

Methods, systems, and apparatus, including computer programs encoded on a computer storage medium, for engineering a data analytics platform using machine learning are disclosed. In one aspect, a method includes the actions of receiving data indicating characteristics of data for analysis, analysis techniques to apply to the data, and requirements of users accessing the analyzed data. The actions further include accessing provider information that indicates computing capabilities of a respective data analysis provider, analysis techniques provided by the respective data analysis provider, and real-time data analysis loads of the respective data analysis provider. The actions further include applying the characteristics of the data, the analysis techniques, the requirements of the users, and the provider information, the analysis techniques, and the real-time data analysis loads to a model. The actions further include configuring the one or more particular data analysis providers to perform the analysis techniques on the data.

16 Claims, 4 Drawing Sheets

(56) References Cited

U.S. PATENT DOCUMENTS

| | | | |
|---|---|---|---|
| 2014/0006338 A1 | 1/2014 | Watson et al. | |
| 2014/0189702 A1* | 7/2014 | Yan | G06F 9/5027 |
| | | | 718/104 |
| 2015/0149434 A1 | 5/2015 | Liu et al. | |
| 2016/0328644 A1* | 11/2016 | Lin | G06N 3/08 |
| 2017/0019302 A1 | 1/2017 | Lapiotis et al. | |
| 2017/0032026 A1 | 2/2017 | Parker et al. | |
| 2017/0053242 A1 | 2/2017 | Ayyaswami | |
| 2017/0076105 A1 | 3/2017 | Paulovicks et al. | |
| 2017/0177309 A1 | 6/2017 | Bar-or et al. | |
| 2017/0206034 A1 | 7/2017 | Fetik | |
| 2017/0286861 A1* | 10/2017 | Kelly | G06N 99/005 |

OTHER PUBLICATIONS

Manish Verma, G R Gangadharan, V. Ravi, and Nanjangud C Narendra, "Resource Demand Prediction in Multi-tenant Service Clouds", 2013, 2013 IEEE International Conference on Cloud Computing in Emerging Markets (CCEM), p. 1-8. (Year: 2013).*

Qian Zhu and Gagan Agrawal, "Resource Provisioning with Budget Constraints for Adaptive Applications in Cloud Environments", 2012, IEEE Transactions on Services Computing, vol. 5, No. 4, pp. 497-511. (Year: 2012).*

Benny Rochwerger,David Breitgand,Amir Epstein,David Hadas, Irit Loy, Kenneth Nagin,Johan Tordsson,Carmelo Ragusa, Massimo Villari,Stuart Clayman, Eliezer Levy,Alessandro Maraschini,Philippe Massonet,Henar Muñoz, and Giovanni Toffetti, "Reservoir—When One Cloud Is Not Enough", 2011, IEEE, pp. 44-51. (Year: 2011).*

EP Search Report and Written Opinion in European Application No. 18201663.4, dated Mar. 14, 2019, 9 pages.

Gueyoung et al., "CloudAdvisor: a recommendation-as-a-Service Platform for cloud configuration and pricing," Presented at 2013 IEEE Ninth World Congress on Services, Santa Clara, California, Jun. 28-Jul. 3, 2013, 8 pages.

Quinton et al., "Automated selection and configuration of cloud environments using software product lines principles," Presented at 2014 IEEE 7$^{th}$ International Conference on Could Computing, Anchorage, Alaska, Jun. 27-Jul. 2, 2014, 8 pages.

Zhipeng et al., "A service brokering and recommendation mechanism for better selecting cloud services," PLOS One, Aug. 29, 2014, vol. 9, No. 8 pp. 1-20, 20 pages.

* cited by examiner

ENGINEERING DATA ANALYTICS PLATFORMS USING MACHINE LEARNING

CROSS-REFERENCE TO RELATED APPLICATION

This application claims the benefit of Indian Application No. 201711038396, filed Oct. 30, 2017, the contents of which are incorporated by reference.

TECHNICAL FIELD

This specification generally relates to machine learning.

BACKGROUND

Machine learning is related to the study and construction of algorithms that can learn from and make predictions on data. The algorithms may overcome following strictly static program instructions by making data-driven predictions or decisions through building a model from sample inputs.

SUMMARY

Companies store data in many different forms. For example, one company may have data stored in spreadsheets and/or word processing documents. Other companies may have medical records in an electronic medical record database. Creating a data analytics platform to process and visualization these and other different type of data may require a custom platform for each company. Creating this custom platform may be a laborious and time consuming process. Additional, the custom platform may be different depending not only on the requirements of the company and the underlying data, but also on the real-time processing capabilities of various data storage and analysis service providers.

To engineer and generate a custom data analytics platform a system may collect information from different sources and apply the information to a model. The different sources may include responses to questions related to any requirements for the data analytics platform. Some requirements may be related to security requirements, type of users accessing the data analytics platform, and access requirements. Another source may include real-time processing and storage capabilities of various data storage and analysis service providers. The system may also factor in historical information that relates to the performance of previous data analytics platforms. The system processes the response information, the provider information, and the historical information using a model to identify an appropriate configuration of resources for the data analytics platform. The configuration may indicate the data storage provider, the data analysis provider, the computing and/or storage resources to be included, the access and security configuration, and other similar configuration items. The system may continue to gather information on the usage of the data analytics platform and update the model based on the gathered information.

According to an innovative aspect of the subject matter described in this application, a method for engineering a data analytics platform using machine learning frequencies includes the actions of receiving data indicating characteristics of data for analysis, analysis techniques to apply to the data, and requirements of users accessing the analyzed data; accessing, for each of a data analysis provider, provider information that indicates computing capabilities of a respective data analysis provider, analysis techniques provided by the respective data analysis provider, and real-time data analysis loads of the respective data analysis provider; applying the characteristics of the data, the analysis techniques to apply to the data, the requirements of the users accessing the analyzed data, and the provider information that indicates the computing capabilities of each data analysis provider, the analysis techniques provided by each data analysis provider, and the real-time data analysis loads of the respective data analysis provider to a model that identifies, from among the data analysis providers, one or more particular data analysis providers that are capable of performing the analysis techniques and that satisfy the requirements of the users; and based on the model identifying the one or more particular data analysis providers, configuring the one or more particular data analysis providers to perform the analysis techniques on the data.

These and other implementations can each optionally include one or more of the following features. The characteristics of the data include a location where the data is stored and types of the users accessing the analyzed data. The requirements of the users accessing the analyzed data includes access requirements, compliance requirements, and security requirements. The computing capabilities include locations of servers and processing capabilities for each of the data analysis providers. The real-time data analysis loads includes real-time server loads for each of the data analysis providers. The actions further include providing, for output, prompts that request the characteristics of the data, the analysis techniques to apply to the data, the requirements of the users accessing the analyzed data. The actions further include generating the prompts based on the provider information that indicates the computing capabilities of each data analysis provider, the analysis techniques provided by each data analysis provider, and the real-time data analysis loads of each data analysis provider.

The actions further include accessing, for each of the data analysis providers, historical information that includes characteristics of past data analyzed, past data analysis loads during analysis of the past data, past analysis techniques applied to the past data, and past configurations of the data analysis providers used to analyze the past data; and training, using machine learning, the model using the historical information that includes the characteristics of the past data analyzed, the past data analysis loads during analysis of the past data, the past analysis techniques applied to the past data, and the past configurations of the data analysis providers used to analyze the past data. The actions further include, after configuring the one or more particular data analysis providers to perform the analysis techniques on the data, accessing, from the one or more particular data analysis providers, current data analysis loads during analysis of the data; and updating, using machine learning, the model using the current data analysis loads during analysis of the data, the characteristics of the data, the analysis techniques applied to the data, and data identifying the configuration of the one or more particular data analysis providers. The actions further include collecting usage information that indicates a performance of the one or more data analysis providers in generating the analyzed data and that indicates a usage of the analyzed data by the users; and, based on the usage information, updating the historical information. The historical information includes usage of the past data analyzed.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A system may create a data analytics platform that is configured to allow users to interact with visualizations of underlying data. The data analytics platform may be configured to balance user requirements and real-time processing capabilities of data analysis service providers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
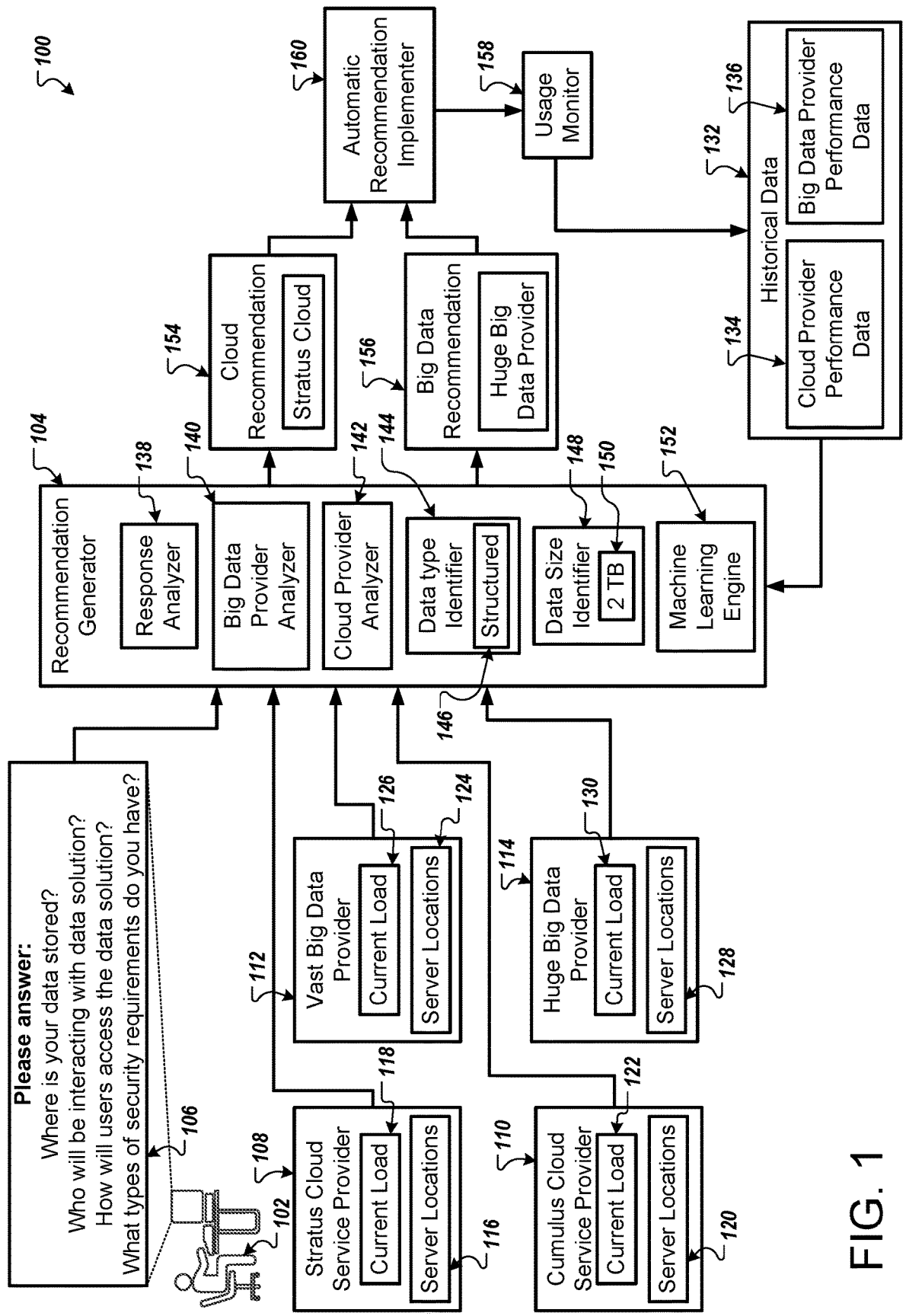
FIG. 1 is an example system for performing data analytics using machine learning.

FIG. 1 is an example system 100 for performing data analytics using machine learning. Briefly, and as described in more detail below, the system 100 collects response data from the user 102 related to the user's requirements for a data analytics platform. The system 100 access real-time data related to the capabilities of various data storage and analysis providers and historical data that relates to previous data analytics platform. The system 100 generates a recommended configuration of resources from selected data storage and analysis providers by applying a model to the response data, the real-time data, and the historical data.

In more detail, the recommendation generator 104 prompts the user 102 with questions 106 to gather response information. The questions 106 may be related to the data for which the user 102 requests a data processing platform such as analytical processing and visualizations. In some implementations, the questions 106 may be related to the location of the servers where the data is stored. For example, some of the data may be stored in a server located in California and some of the data may be stored in a server located in Florida. In some implementations, the questions 106 may be related to a type of user who will be interacting with the visualizations. For example, the user may be salesperson, a data scientist, or a marketing executive. The questions 106 may relate to the characteristics of the user, such as a type of visualizations that the user prefers. In some implementations, the questions 106 relate to the access requirements for the users. For example, the users may access the visualizations and processed data through a web interface, a desktop application, a mobile application, etc. In some implementations, the questions 106 may be related to the security requirements for the data owner and the users. For example, the data owner may require that the users be behind a firewall, use two factor authentication, scan the client device for viruses before accessing the data, etc.

The recommendation generator 104 accesses provider information from various data analysis providers. The data analysis providers may include cloud storage providers. The cloud storage providers may be able to store and host the data for analysis. As an example, one of the cloud storage providers may be Stratus Cloud Service Provider 108. The Stratus Cloud Service Provider 108 may provide server locations 116 in areas such as New York and Texas. The Stratus Cloud Service Provider 108 may also provide real-time data that is related to the current load 118 of the servers. For example, the current load 118 of the Texas servers may be at eighty percent. The current load 118 of the New York servers may be sixty percent. The Stratus Cloud Service Provider 108 may include an interface, such as an API, that allows the recommendation generator 104 to access the current load data 118 and the server location data 116.

The recommendation generator 104 may access provider information from other cloud storage providers. For example, the recommendation generator 104 may access, through an API, provider information for Cumulus Cloud Service Provider 110. The provider information for the Cumulus Cloud Service Provider 110 may include server location information 120. The server location information 120 may indicate that the Cumulus Cloud Service Provider 110 has servers in Colorado and Illinois. The provider information for the Cumulus Cloud Service Provider 110 may also include current load information 122 for the Colorado servers, which is fifty percent, and the Illinois servers, which is seventy percent.

The recommendation generator 104 may access provider information from other data analysis providers such as analytic data processing providers. The analytic data service providers may include Big Data service providers that use predictive analytics, user behavior analytics, or other advanced data analytics methods to extract value from data. As an example, one of the analytic data processing providers may be Vast Big Data Provider 112. The Vast Big Data Provider 112 may provide server locations 124 in areas such as New York and Washington. The Vast Big Data Provider 112 may also provide real-time data that is related to the current load 126 of the servers. For example, the current load 126 of the New York servers may be at one hundred percent. The current load 118 of the Washington servers may be ninety percent. The Vast Big Data Provider 112 may include an interface, such as an API, that allows the recommendation generator 104 to access the current load data 126 and the server location data 124.

The recommendation generator 104 may access provider information from other analytic data processing providers. For example, the recommendation generator 104 may access, through an API, provider information for Huge Big Data Provider 114. The provider information for the Huge Big Data Provider 114 may include server location information 128. The server location information 128 may indicate that the Huge Big Data Provider 114 has servers in Tennessee and Utah. The provider information for the Huge Big Data Provider 114 may also include current load information 130 for the Tennessee servers, which is sixty percent, and the Utah servers, which is seventy percent.

The recommendation generator 104 may access historical information 132. The historical information 132 may include data related to previous users who have accessed the recommendation generator 104 for data analytics platforms. The historical information 132 may include cloud performance data 134 that describes how various cloud service providers performed in storing and providing access to each user's data. The cloud performance data 134 may include the speed at which a cloud service provided access to the data, the location of the server, the load of the server, and any other similar information. The historical information 132 may include big data provider performance data 136 that describes how various big data service providers performed in analyzing and providing visualizations for each user's data. The big data provider performance data 136 may include the speed at which the big data provider provided data visualizations, the location of the server, the load of the server, and any other similar information. In some implementations, the historical information 132 may include data related to the users accessing the data analytics platform. For example, the historical information 132 may indicate that one of the users was a data scientist who accessed the data analytics platform and requested data displayed in tables.

The recommendation generator 104 processes the response information from the questions 106, the provider information from the data analysis providers 108, 110, 112, and 114, and the historical information 132. The recommendation generator 104 generates a recommendation for the user 102 for a data analytics platform for the user's data.

The recommendation generator 104 includes a response analyzer 138. The response analyzer generates and analyzes the response information provided by the user 102 during answering of the questions 106. In some implementations, the response analyzer 138 generates additional questions based on the answers to the questions 106. For example, the response analyzer 138 may ask whether the user 102 will require that the end users access the data analytics platform by logging into a website. In instances where the user 102 answers yes, the response analyzer 138 may ask a follow up question related to whether the end users will be required to be behind a firewall.

The recommendation generator 104 includes a big data provider analyzer 140 and a cloud provider analyzer 142. The big data provider analyzer 140 and a cloud provider analyzer 142 analyze the access information gathered from the publicly accessible information of the cloud service providers 108 and 110 and the big data service providers 112 and 114. The big data provider analyzer 140 and a cloud provider analyzer 142 may be configured to interact with the APIs provided by the cloud service providers 108 and 110 and the big data service providers 112 and 114 to collect the access information. In some implementations, the response analyzer 138 may generate questions based on the access information gathered by the big data provider analyzer 140 and a cloud provider analyzer 142. For example, the big data provider analyzer 140 may access data that indicates that a server for the Vast Big Data Provider 112 with low current load is located closer to the Status Cloud Service Provider 108 than to the Cumulus Cloud Service Provider 110. The Status Cloud Service Provider 108 may have a higher current load 118 than the current load 122 of the Cumulus Cloud Service Provider 110. The response analyzer 138 may generate a question that is related whether faster login times are more or less important than faster data analysis times. A cloud service provider that is closer to a big data service provider may provide faster login times, but if the closer cloud service provider has a higher load, then it may have difficulty continuously providing information to the big data service provider.

The recommendation generator 104 includes a data type identifier 144. The data type identifier 144 may be configured to analyze and identify a type of data for which the user 102 is requesting a data analytics platform. The data may be structured data, unstructured data, semi-structured data, a combination of the three, or any other type of structure. In the example of FIG. 1, the data type identifier 144 determines that the data is structured data 146. The recommendation generator 104 may use this determination to generate the data analytics platform recommendation.

The recommendation generator 104 includes a data size identifier 148. The data type identifier 148 may be configured to analyze and identify the size of data for which the user 102 is requesting a data analytics platform. The data size identifier 148 may determine the size of each different data type. In the example of FIG. 1, the data type identifier 148 determines that the data size 150 is two terabytes. The recommendation generator 104 may use this size determination to generate the data analytics platform recommendation.

The recommendation generator 104 includes a machine learning engine 152. The machine learning engine 152 may be configured to train a model that is configured to generate the data analytics platform recommendation based on the response information from user 102, the real-time provider information from providers 108, 110, 112, and 114, and the historical information 132. The machine learning engine 152 may train the model using user interactions with previous data analytics platforms. For example, machine learning engine 152 may train the model using information related to a number of times that a data scientist accessed a data analytics platform, the application that the data scientist used to access the data analytics platform, whether there were any virus or security incidents with the data analytics platform, the size of the underlying data, the selected big data provider, the selected cloud service provider, the performance of the selected big data provider and selected cloud service provider, the size of the underlying data, the number and types of other users who accessed the data analytics platform, the security and virus scanning configuration, and any other similar types of information. Some of this information may be stored as part of the historical information 132.

The recommendation generator 104 generates a cloud recommendation 154 and a big data recommendation 156. The recommendations may be based on the response information from user 102, the real-time provider information from providers 108, 110, 112, and 114, and the historical information 132. In this example, the recommendation generator 104 determines that the stratus cloud provider may be a better cloud provider in view of the historical data 132, the answers provided by user 102, and the real-time cloud provider information. Additionally, the recommendation generator 104 determines that the huge big data provider may be a better big data provider in view of the historical data 132, the answers provided by user 102, and the real-time cloud provider information.

The system 100 includes a usage monitor 158 that is configured to monitor the interactions of user 102 and other users with the data analytics platform recommendation. The usage monitor 158 may collect data and provide that collected data to the historical data 132. The machine learning engine 152 may use the collected data to further train the model. The data collected by the usage monitor 158 may be similar to the data used to previously train the machine learning engine 152. for example, the usage monitor 158 may collect a number of times that the user 102 and other users access the data analytics platform, the application that the user 102 and other users use to access the data analytics platform, whether there were any virus or security incidents with the data analytics platform, the size of the underlying data, the selected big data provider, the selected cloud service provider, the performance of the selected big data provider and selected cloud service provider, the size of the underlying data, the number and types of other users who accessed the data analytics platform, the security and virus scanning configuration, and any other similar types of information.

In some implementations, the system 100 includes an automatic recommendation implementer 160. The automatic recommendation implementer 160 is configured to automatically configure the recommended data analysis providers without the user having to implement the recommendation. The system 100 may utilize the automatic recommendation implementer 160 in instances where the user does not provide an indication that the user wants to receive a recommendation before implementation.

Figure 2:
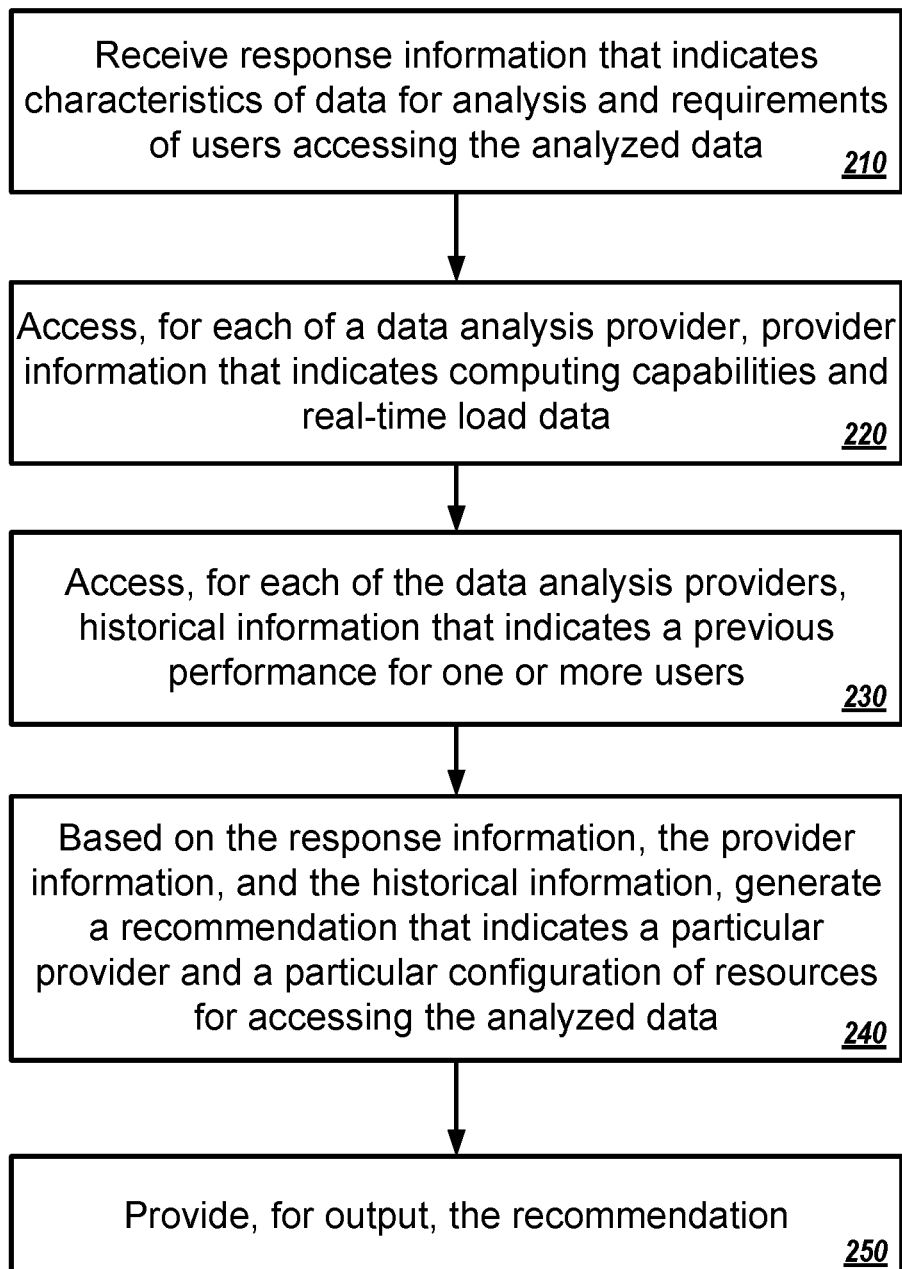
FIG. 2 is a flowchart of an example process for performing data analytics using machine learning.

FIG. 2 is a flowchart of an example process 200 for performing data analytics using machine learning. In general, the process 200 generates a data analytics platform recommendation based on responses to queries, real-time data cloud and analytics provider information, and historical information related to previous data analytics platforms. The process 200 will be described as being performed by a computer system comprising one or more computers, for example, the system 100 of FIG. 1.

The system receives response information that indicates characteristics of data for analysis and requirements of users accessing the analyzed data (210). In some implementations, the characteristics of the data for analysis include a location where the data is stored and types of the users accessing the analyzed data. For example, the data may be distributed across several servers in Ohio and North Carolina. Users may be accessing the data analytics platform from all over the world. The users may include data scientists. In some implementations, the requirements of the users accessing the data analytics platform includes access requirements and security requirements. For example, the users may be required to access the data analytics platform from behind a firewall using a native application on a mobile computing device or a web application.

The system accesses, for each of a data analysis provider, provider information that indicates computing capabilities and real-time load data (220). In some implementations, the computing capabilities include locations of servers and processing capabilities for each of the data analysis providers. For example, the servers for a cloud service provider may be located in Washington. In some implementations, the real-time load data for the computing capabilities includes real-time server loads for each of the data analysis providers. For example, the real-time server load for a big data service provider may be eighty percent.

In some implementations, the system may generate prompts to solicit the response information from the user. For example, the system may prompt the user for information on the type of users who will be accessing the data analytics platform. In some implementations, the system may generate prompts dynamically based on the real-time provider information.

The system accesses, for each of the data analysis providers, historical information that indicates a previous performance for one or more users (230). In some implementations, the historical information includes usage of previously analyzed data and a corresponding configuration for the previously analyzed data. For example, the historical information may include a number of times that a user and other users access the data analytics platform, the application that the user and other users use to access the data analytics platform, whether there were any virus or security incidents with the data analytics platform, the size of the underlying data, the selected big data provider, the selected cloud service provider, the performance of the selected big data provider and selected cloud service provider, the size of the underlying data, the number and types of other users who accessed the data analytics platform, the security and virus scanning configuration, and any other similar types of information.

The system, based on the response information, the provider information, and the historical information, generates a recommendation that indicates a particular provider and a particular configuration of resources for accessing the analyzed data (240). In some implementations, the system generated the recommendation by applying a model. The system may train the model using machine learning and the historical information. The model may be configured to generate a data analytics platform recommendation based on the response information, the provider information, and the historical information.

The system provides, for output, the recommendation (250). In some implementations, the system monitors the usage of the recommended data analytics platform. The system collects data related to the performance of the recommended data analysis providers. The system uses that information, in addition to the information used to generate the recommended data analytics platform, to further train the model using machine learning. The recommendation 250 may be output in one of many forms, including, for display to a user, and, as a manifest for consumption by a deployment engine.

Figure 3:
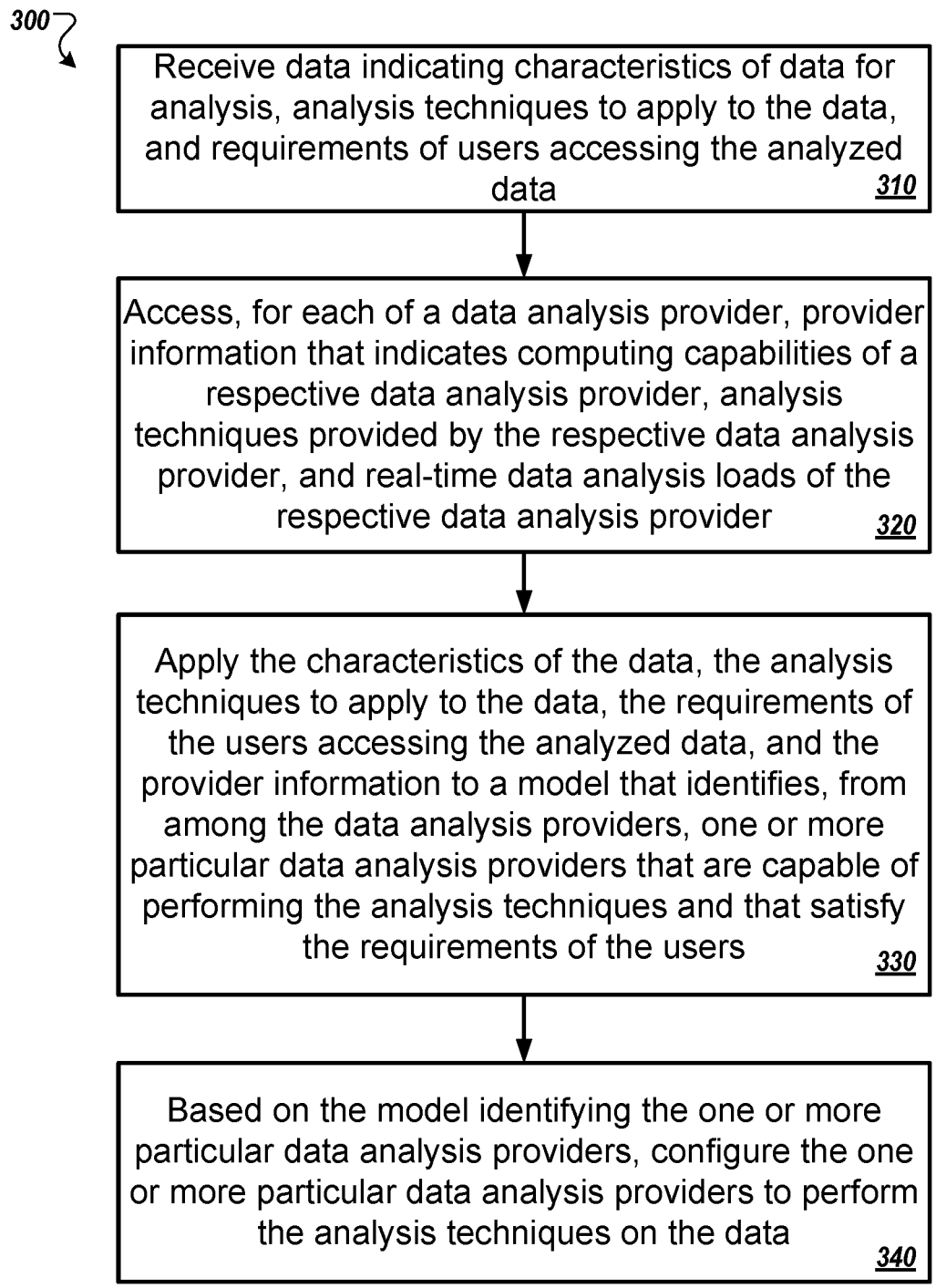
FIG. 3 is a flowchart of an example process for automatically selecting and configuring data analysis providers.

FIG. 3 is a flowchart of an example process 300 for automatically selecting and configuring data analysis providers. In general, the process 300 automatically selects and configures one or more data analysis providers based on responses to queries, real-time data cloud and analytics provider information, and historical information related to previous configurations of the selected data analysis providers and other data analysis providers. The process 300 will be described as being performed by a computer system comprising one or more computers, for example, the system 100 of FIG. 1.

The system receives data indicating characteristics of data for analysis, analysis techniques to apply to the data, and requirements of users accessing the analyzed data (310). In some implementations, the characteristics of the data include the location of where the data is stored. For example, the data may be located on a server in California or the data may be located across different servers that may be located in Florida and Arkansas. The location may also specify the type of computing device storing the data. For example, the data may be located on a computing device that has an eight-core processor and sixty-four gigabytes of memory. In some implementations, the characteristics of the data include the types of users who access the analyzed data. The type of user may related to the users job description. For example, a user may be salesperson, a data scientist, a marketing executive, or any other similar type of user. The characteristics of the data may also include whether the data is structured or unstructured and the size of the data (e.g., two terabytes). In some implementations, the analysis techniques may include performing data analytics and displaying visualizations.

In some implementations, the requirements of the users accessing the analyzed data may include access requirements, compliance requirements, and security requirements. For example, the some users may need to access the analyzed data through a mobile device. As another example, the data may be healthcare related and as such may require storage and access requires in compliance with any applicable laws. As an additional example, the data owner may require that the data be encrypted.

In some implementations, the system may generate prompts to request the characteristics of the data, the analysis techniques to apply to the data, and the requirements of users accessing the analyzed data. For example, the prompts may include questions such as, "Where is the data stored?" and "What are the requirements of the users accessing the analyzed data?"

In some implementations, the prompts may be based on the computing capabilities of the available data analysis providers, the analysis techniques provided by available data analysis providers, and the real-time data analysis loads of the available data analysis providers. For example, the available data analysis providers may be configured to process both structured and unstructured data. Additionally or alternatively, the available data analysis providers may perform differently when processing structured verses unstructured data because, for example, one of the data analysis providers may be processing an unusually large amount of unstructured data. In this instance, the system may generate a prompt that asks what portion of the data is structured and what portion is unstructured.

The system accesses, for each of a data analysis provider, provider information that indicates computing capabilities of a respective data analysis provider, analysis techniques provided by the respective data analysis provider, and real-time data analysis loads of the respective data analysis provider (320). In some implementations, the computing capabilities include locations of servers and processing capabilities of each data analysis provider. For example, the servers for a data analysis provider may be located in Texas and Utah. Processing capabilities may include cloud computing services, data analytics services, and other similar data processing services. In some implementations, the real-time data analysis loads, or real-time/batch loads, may include the current processing loads realized by each data analysis provider. The real-time data analysis loads may be an absolute value or a relative value. For example, one data analysis provider may be processing data at eighty percent capacity. Another data analysis provider may be processing ten terabytes of data.

The system applies the characteristics of the data, the analysis techniques to apply to the data, the requirements of the users accessing the analyzed data, and the provider information that indicates the computing capabilities of each data analysis provider, the analysis techniques provided by each data analysis provider, and the real-time data analysis loads of the respective data analysis provider to a model that identifies, from among the data analysis providers, one or more particular data analysis providers that are capable of performing the analysis techniques and that satisfy the requirements of the users (330). In some implementations, the system accesses historical information that includes characteristics of past data analyzed, past data analysis loads during analysis of the past data, past analysis techniques applied to the past data, and past configurations of the data analysis providers used to analyze the past data. For example, for a configuration may be a particular cloud computing provider and a particular big data provider. The configuration of the particular cloud computing provider and the particular big data provider may have analyzed one terabyte of structured data and provided data visualization services. The user may have been located in Pennsylvania and the particular cloud computing provider and the particular big data provider may have both been located in California. The particular cloud computing provider may have been operating at eighty-five percent capacity before processing the data and eighty-eight percent capacity while processing the data. The particular big data provider may have been operating at fifty percent capacity before processing the data and sixty percent capacity while processing the data.

In some implementations, the system trains, using machine learning, the model using the historical information. The trained model is able to provide an optimized configuration of data analysis providers based on the characteristics of data for analysis, analysis techniques to apply to the data, requirements of users accessing the analyzed data, the current load of each data analysis provider, and the location of each data analysis provider. The model may provide the configuration of data analysis providers that is able to satisfy the requirements of the users and avoid a data analysis provider that may not have the capacity to process additional data.

The system, based on the model identifying the one or more particular data analysis providers, configures the one or more particular data analysis providers to perform the analysis techniques on the data (340). In some implementations, the system automatically configures the selected data analysis providers and instructs the data analysis providers to perform the analysis techniques on the data.

In some implementations, the system monitors the performance of the selected data analysis providers while the selected data analysis providers perform the analysis techniques on the data and/or while the users access the analyzed data. The system may update, using machine learning, the model using the performance of the selected data analysis providers while the selected data analysis providers perform the analysis techniques on the data and/or while the users access the analyzed data, the characteristics of the data, the analysis techniques applied to the data, and data identifying the configuration of the one or more particular data analysis providers. The system may update the historical information that the system uses to train to include the performance of the selected data analysis providers while the selected data analysis providers perform the analysis techniques on the data and/or while the users access the analyzed data, the characteristics of the data, the analysis techniques applied to the data, and data identifying the configuration of the one or more particular data analysis providers. In some implementations, the historical information includes data related to how the users accessed and consumed the analyzed data.

Figure 4:
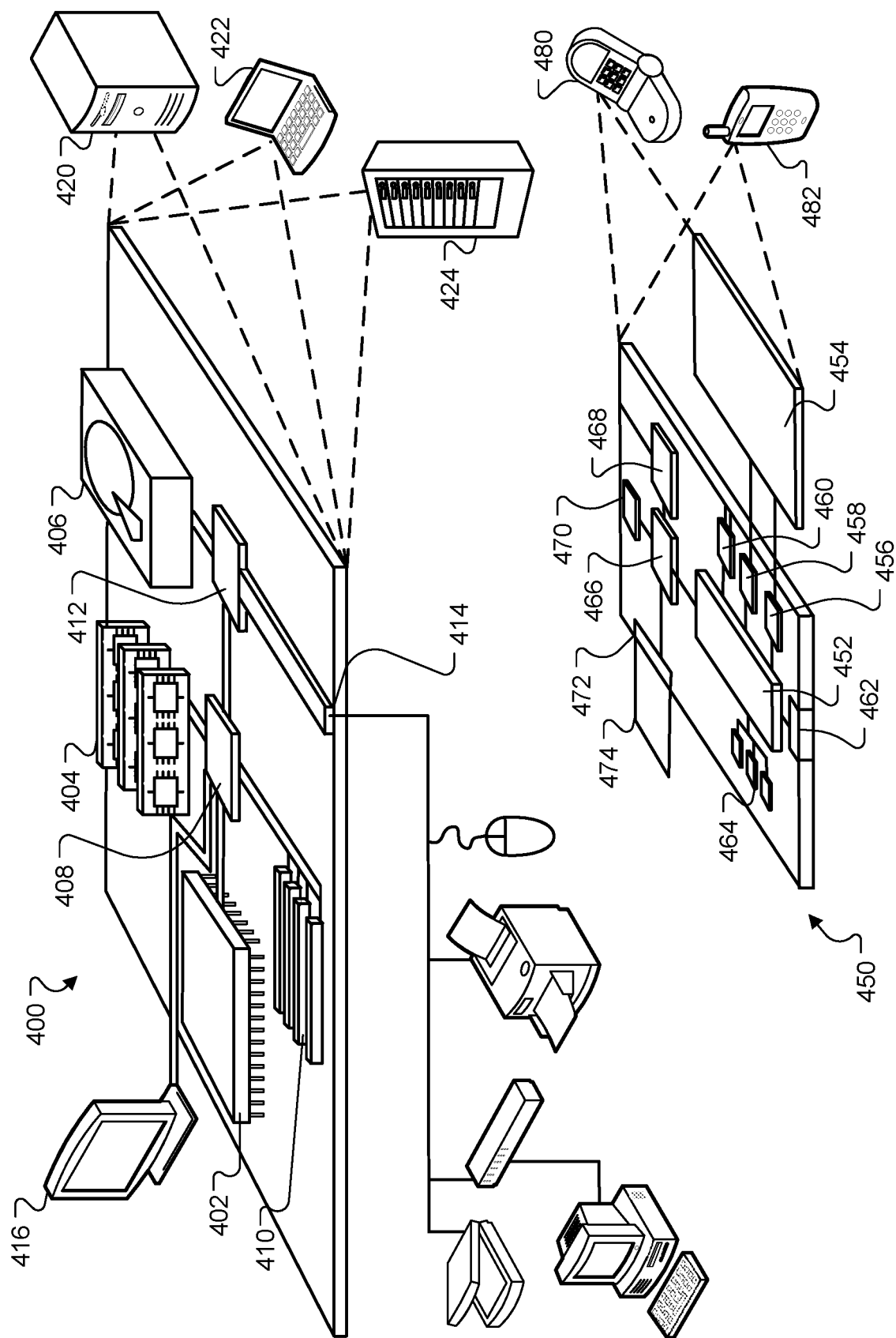
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, wireless (e.g., Bluetooth) headsets, hearing aid, smart watches, smart glasses, activity trackers, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, a microphone, speakers, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a touch-enabled display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
accessing, for each data analysis provider of one or more data analysis providers that are configured to analyze received data, historical information that includes (i) characteristics of past data analyzed by a respective data analysis provider, (ii) past computing loads during analysis of the past data by the respective data analysis provider, (iii) analysis techniques offered by the respective data analysis provider, (iv) a subset of the analysis techniques offered by the respective data analysis provider and applied to the past data by the respective data analysis provider, (v) past configurations of the respective data analysis provider used to analyze the past data, and (vi) access and security requirements implemented by the respective data analysis provider for users accessing analyzed past data;
training, using machine learning and using the historical information that includes (i) the characteristics of the past data analyzed by the respective data analysis provider, (ii) the past computing loads during analysis of the past data by the respective data analysis provider, (iii) the analysis techniques offered by the respective data analysis provider, (iv) the subset of the analysis techniques offered by the respective data analysis provider and applied to the past data by the respective data analysis provider, (v) the past configurations of the respective data analysis provider used to analyze the past data, and (vi) the access and security requirements implemented by the respective data analysis provider for users accessing the analyzed past data, a model that is configured to receive (i) given data indicating characteristics of data for analysis, (ii) given analysis techniques offered by each of the data analysis providers, (iii) a subset of the given analysis techniques offered by each of the data analysis providers and applied to the data by each of the data analysis providers, (iv) given computing loads of each of the data analysis providers, and (v) given data indicating access and security requirements for users accessing analyzed data and output given data indicating a configuration for a subset of the data analysis providers;

providing, for output, prompts requesting information related to access and security requirements for users accessing analyzed data;

in response to providing the prompts requesting the information related to the access and security requirements for users accessing the analyzed data, receiving, from a user, the information related to the access and security requirements for users accessing the analyzed data;

accessing, for each data analysis provider, provider information that indicates analysis techniques offered by the respective data analysis provider, and real-time computing loads of the respective data analysis provider;

receiving data indicating characteristics of data for analysis and a subset of the analysis techniques offered by each data analysis provider to apply to the data;

providing, as an input to the model, (i) the data indicating the characteristics of the data for analysis, (ii) the data indicating the subset of the analysis techniques offered by each data analysis provider to apply to the data, (iii) the data indicating the analysis offered by each data analysis provider, (iv) the real-time computing loads of each data analysis provider, and (v) the information related to the access and security requirements for users accessing the analyzed data;

based on providing, as the input to the model (i) the data indicating the characteristics of the data for analysis, (ii) the data indicating the subset of the analysis techniques offered by each data analysis provider to apply to the data, (iii) the data indicating the analysis offered by each data analysis provider, (iv) the real-time computing loads of each data analysis provider, receiving, from the model, data indicating a configuration for a subset of the one or more data analysis providers, and (v) the information related to the access and security requirements for users accessing the analyzed data;

based on receiving, from the model the data indicating the configuration for the subset of the one or more data analysis providers, configuring the subset of the one or more data analysis providers to apply the analysis techniques to data;

while the subset of the one or more data analysis providers applies the analysis techniques to the data, monitoring the computing loads of each data analysis provider of the subset of the one or more data analysis providers; and updating the model based on (i) the data indicating the characteristics of the data for analysis, (ii) the data indicating the subset of the analysis techniques offered by each data analysis provider to apply to the data, (iii) the data indicating the analysis offered by each data analysis provider of the subset of the one or more data analysis providers, (iv) the computing loads of each data analysis provider of the subset of the one or more data analysis providers while applying the analysis techniques to the data, (v) the data indicating the configuration for the subset of the one or more data analysis providers, and (vi) the information related to the access and security requirements for users accessing the analyzed data.

2. The method of claim 1, wherein:
the characteristics of the data include a location where the data is stored and types of users accessing the analyzed data.

3. The method of claim 1, wherein:
the analysis techniques offered by each data analysis provider includes processing capabilities for each of the data analysis providers, and
the real-time computing loads includes real-time server loads for each of the data analysis providers.

4. The method of claim 1, comprising:
providing, for output, prompts that requests the characteristics of the data for analysis; and
in response to the prompts, receiving, from a user, the data indicating characteristics of the data for analysis.

5. The method of claim 4, comprising:
generating the prompts based on the analysis techniques offered by each data analysis provider, and the real-time computing loads of each data analysis provider.

6. The method of claim 1, comprising:
collecting usage information that indicates a performance of the subset one or more data analysis providers while applying the analysis techniques to the data and that indicates a usage of the analyzed data by the users; and
based on the usage information, updating the historical information.

7. The method of claim 1, wherein the historical information includes usage of the past data analyzed.

8. A system comprising:
one or more computers; and
one or more storage devices storing instructions that are operable, when executed by the one or more computers, to cause the one or more computers to perform operations comprising:
accessing, for each data analysis provider of one or more data analysis providers that are configured to analyze received data, historical information that includes (i) characteristics of past data analyzed by a respective data analysis provider, (ii) past computing loads during analysis of the past data by the respective data analysis provider, (iii) analysis techniques offered by the respective data analysis provider, (iv) a subset of the analysis techniques offered by the respective data analysis provider and applied to the past data by the respective data analysis provider, (v) past configurations of the respective data analysis provider used to analyze the past data, and (vi) access and security requirements implemented by the respective data analysis provider for users accessing analyzed past data;

training, using machine learning and using the historical information that includes (i) the characteristics of the past data analyzed by the respective data analysis provider, (ii) the past computing loads during analysis of the past data by the respective data analysis provider, (iii) the analysis techniques offered by the respective data analysis provider, (iv) the subset of the analysis techniques offered by the respective data analysis provider and applied to the past data by the respective data analysis provider, (v) the past configurations of the respective data analysis provider used to analyze the past data, and (vi) the access and security requirements implemented by the respective data analysis provider for users accessing the analyzed past data, a model that is configured to receive (i) given data indicating characteristics of data for analysis, (ii) given analysis techniques offered by each of the data analysis providers, (iii) a subset of the given analysis techniques offered by each of the data analysis providers and applied to the data by each of the data analysis providers, (iv) given computing loads of each of the data analysis providers, and (v) given data indicating access and security requirements for users accessing analyzed data and output given data indicating a configuration for a subset of the data analysis providers;

providing, for output, prompts requesting information related to access and security requirements for users accessing analyzed data;

in response to providing the prompts requesting the information related to the access and security requirements for users accessing the analyzed data, receiving, from a user, the information related to the access and security requirements for users accessing the analyzed data;

accessing, for each data analysis provider, provider information that indicates analysis techniques offered by the respective data analysis provider, and real-time computing loads of the respective data analysis provider;

receiving data indicating characteristics of data for analysis and a subset of the analysis techniques offered by each data analysis provider to apply to the data;

providing, as an input to the model, (i) the data indicating the characteristics of the data for analysis, (ii) the data indicating the subset of the analysis techniques offered by each data analysis provider to apply to the data, (iii) the data indicating the analysis offered by each data analysis provider, (iv) the real-time computing loads of each data analysis provider, and (v) the information related to the access and security requirements for users accessing the analyzed data;

based on providing, as the input to the model (i) the data indicating the characteristics of the data for analysis, (ii) the data indicating the subset of the analysis techniques offered by each data analysis provider to apply to the data, (iii) the data indicating the analysis offered by each data analysis provider, (iv) the real-time computing loads of each data analysis provider, receiving, from the model, data indicating a configuration for a subset of the one or more data analysis providers, and (v) the information related to the access and security requirements for users accessing the analyzed data;

based on receiving, from the model the data indicating the configuration for the subset of the one or more data analysis providers, configuring the subset of the one or more data analysis providers to apply the analysis techniques to data;

while the subset of the one or more data analysis providers applies the analysis techniques to the data, monitoring the computing loads of each data analysis provider of the subset of the one or more data analysis providers; and updating the model based on (i) the data indicating the characteristics of the data for analysis, (ii) the data indicating the subset of the analysis techniques offered by each data analysis provider to apply to the data, (iii) the data indicating the analysis offered by each data analysis provider of the subset of the one or more data analysis providers, (iv) the computing loads of each data analysis provider of the subset of the one or more data analysis providers while applying the analysis techniques to the data, (v) the data indicating the configuration for the subset of the one or more data analysis providers, and (vi) the information related to the access and security requirements for users accessing the analyzed data.

9. The system of claim 8, wherein:
the characteristics of the data include a location where the data is stored and types of users accessing the analyzed data.

10. The system of claim 8, wherein:
the analysis techniques offered by each data analysis provider includes processing capabilities for each of the data analysis providers, and
the real-time computing loads includes real-time server loads for each of the data analysis providers.

11. The system of claim 8, wherein the operations comprise:
providing, for output, prompts that requests the characteristics of the data for analysis; and
in response to the prompts, receiving, from a user, the data indicating characteristics of the data for analysis.

12. The system of claim 11, wherein the operations comprise:
generating the prompts based on the analysis techniques offered by each data analysis provider, and the real-time computing loads of each data analysis provider.

13. The system of claim 8, wherein the operations comprise:
collecting usage information that indicates a performance of the subset one or more data analysis providers while applying the analysis techniques to the data and that indicates a usage of the analyzed data by the users; and
based on the usage information, updating the historical information.

14. The system of claim 8, wherein the historical information includes usage of the past data analyzed.

15. A non-transitory computer-readable medium storing software comprising instructions executable by one or more computers which, upon such execution, cause the one or more computers to perform operations comprising:
accessing, for each data analysis provider of one or more data analysis providers that are configured to analyze received data, historical information that includes (i) characteristics of past data analyzed by a respective data analysis provider, (ii) past computing loads during analysis of the past data by the respective data analysis provider, (iii) analysis techniques offered by the respective data analysis provider, (iv) a subset of the analysis techniques offered by the respective data analysis provider and applied to the past data by the respective data analysis provider, (v) past configurations of the respective data analysis provider used to analyze the past data, and (vi) access and security requirements implemented by the respective data analysis provider for users accessing analyzed past data;

training, using machine learning and using the historical information that includes (i) the characteristics of the past data analyzed by the respective data analysis provider, (ii) the past computing loads during analysis of the past data by the respective data analysis provider, (iii) the analysis techniques offered by the respective data analysis provider, (iv) the subset of the analysis techniques offered by the respective data analysis provider and applied to the past data by the respective data analysis provider, (v) the past configurations of the respective data analysis provider used to analyze the past data, and (vi) the access and security requirements implemented by the respective data analysis provider for users accessing the analyzed past data, a model that is configured to receive (i) given data indicating characteristics of data for analysis, (ii) given analysis techniques offered by each of the data analysis providers, (iii) a subset of the given analysis techniques offered by each of the data analysis providers and applied to the data by each of the data analysis providers, (iv) given computing loads of each of the data analysis providers, and (v) given data indicating access and security requirements for users accessing analyzed data and output given data indicating a configuration for a subset of the data analysis providers;

providing, for output, prompts requesting information related to access and security requirements for users accessing analyzed data;

in response to providing the prompts requesting the information related to the access and security requirements for users accessing the analyzed data, receiving, from a user, the information related to the access and security requirements for users accessing the analyzed data;

accessing, for each data analysis provider, provider information that indicates analysis techniques offered by the respective data analysis provider, and real-time computing loads of the respective data analysis provider;

receiving data indicating characteristics of data for analysis and a subset of the analysis techniques offered by each data analysis provider to apply to the data;

providing, as an input to the model, (i) the data indicating the characteristics of the data for analysis, (ii) the data indicating the subset of the analysis techniques offered by each data analysis provider to apply to the data, (iii) the data indicating the analysis offered by each data analysis provider, (iv) the real-time computing loads of each data analysis provider, and (v) the information related to the access and security requirements for users accessing the analyzed data;

based on providing, as the input to the model (i) the data indicating the characteristics of the data for analysis, (ii) the data indicating the subset of the analysis techniques offered by each data analysis provider to apply to the data, (iii) the data indicating the analysis offered by each data analysis provider, (iv) the real-time computing loads of each data analysis provider, receiving, from the model, data indicating a configuration for a subset of the one or more data analysis providers, and (v) the information related to the access and security requirements for users accessing the analyzed data;

based on receiving, from the model the data indicating the configuration for the subset of the one or more data analysis providers, configuring the subset of the one or more data analysis providers to apply the analysis techniques to data;

while the subset of the one or more data analysis providers applies the analysis techniques to the data, monitoring the computing loads of each data analysis provider of the subset of the one or more data analysis providers; and updating the model based on (i) the data indicating the characteristics of the data for analysis, (ii) the data indicating the subset of the analysis techniques offered by each data analysis provider to apply to the data, (iii) the data indicating the analysis offered by each data analysis provider of the subset of the one or more data analysis providers, (iv) the computing loads of each data analysis provider of the subset of the one or more data analysis providers while applying the analysis techniques to the data, (v) the data indicating the configuration for the subset of the one or more data analysis providers, and (vi) the information related to the access and security requirements for users accessing the analyzed data.

16. The medium of claim 15, wherein:
the characteristics of the data include a location where the data is stored and types of users accessing the analyzed data.

* * * * *